(12) United States Patent
Miyazaki

(10) Patent No.: US 7,745,060 B2
(45) Date of Patent: Jun. 29, 2010

(54) FUEL CELL SYSTEM AND METHOD OF OPERATING THE FUEL CELL SYSTEM

(75) Inventor: Tomio Miyazaki, Hadano (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/205,124

(22) Filed: Sep. 5, 2008

(65) Prior Publication Data

US 2009/0068510 A1    Mar. 12, 2009

(30) Foreign Application Priority Data

Sep. 6, 2007    (JP)    ............... 2007-231411

(51) Int. Cl.
*H01M 8/06* (2006.01)
(52) U.S. Cl. ............... 429/471; 429/90; 429/512
(58) Field of Classification Search ............... 429/19
See application file for complete search history.

(56) References Cited

U.S. PATENT DOCUMENTS

| 4,724,044 A * | 2/1988 | Weishaar et al. ............... 159/32 |
| 2004/0161647 A1 * | 8/2004 | Rainville et al. ............... 429/25 |
| 2006/0166056 A1 * | 7/2006 | Nakamura et al. ............ 429/22 |

FOREIGN PATENT DOCUMENTS

| JP | 2003-183007 | | 7/2003 |
| JP | 2003183007 | * | 7/2003 |
| JP | 2006-216283 | | 8/2006 |
| JP | 2006-260874 | | 9/2006 |
| JP | 2006-327835 | | 12/2006 |
| WO | WO2006080512 | * | 8/2006 |

\* cited by examiner

*Primary Examiner*—Dah-Wei D Yuan
*Assistant Examiner*—Patricia Davis
(74) *Attorney, Agent, or Firm*—Lahive & Cockfield, LLP; Anthony A. Laurentano, Esq.

(57) ABSTRACT

A fuel cell system includes a raw fuel supply channel. A raw fuel supply apparatus, a desulfurizer, and a flow rate meter are provided in the raw fuel supply channel such that the desulfurizer is provided downstream of the raw fuel supply apparatus, and the flow rate meter is provided downstream of the desulfurizer. The raw fuel supply channel includes a first channel area provided upstream of the raw fuel supply apparatus, a second channel area provided downstream of the raw fuel supply apparatus, and upstream of the flow rate meter, a bypass channel having both ends connected to the first channel area and the second channel area, and an open/close valve for opening and closing the bypass channel based on the pressure in the first channel area and the pressure in the second channel area.

5 Claims, 8 Drawing Sheets

--- → EXHAUST GAS
→ AIR
--- → RAW FUEL (REFORMED GAS)

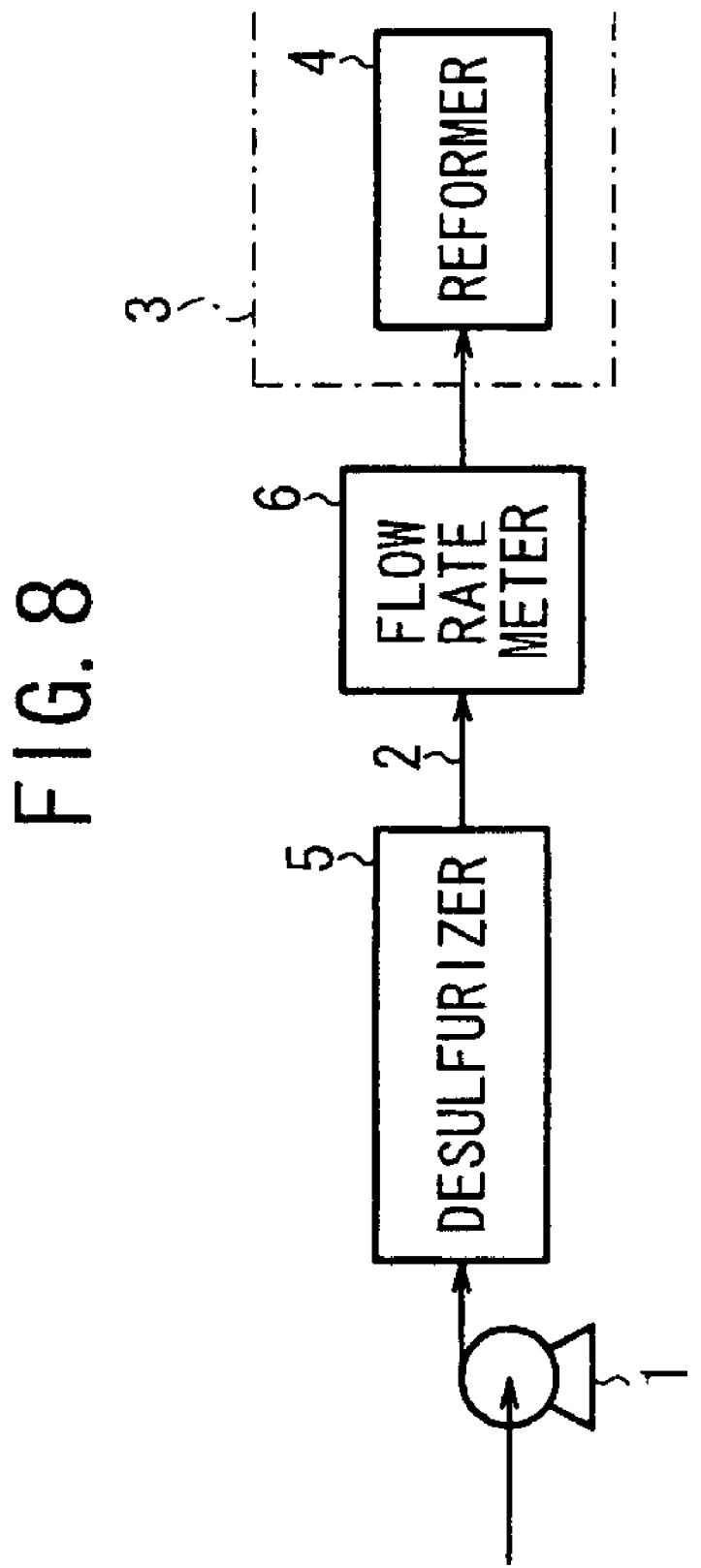

FUEL CELL SYSTEM AND METHOD OF OPERATING THE FUEL CELL SYSTEM

BACKGROUND OF THE INVENTION

1. Field of the Invention

The present invention relates to a fuel cell system including a fuel cell stack, a reforming unit, a raw fuel supply unit, and a water supply unit. Further, the present invention relates to a method of operating the fuel cell system.

2. Description of the Related Art

Typically, a solid oxide fuel cell (SOFC) employs an electrolyte of ion-conductive solid oxide such as stabilized zirconia. The electrolyte is interposed between an anode and a cathode to form an electrolyte electrode assembly (MEA). The electrolyte electrode assembly is interposed between separators (bipolar plates). In use, generally, a predetermined number of the MEAs and the separators are stacked together to form a fuel cell stack.

As the fuel gas supplied to the fuel cell, normally, a hydrogen gas generated from hydrocarbon raw material by a reformer is used. In general, in the reformer, a reformed raw material gas is obtained from hydrocarbon raw material of a fossil fuel or the like, such as methane or LNG, and the reformed raw material gas undergoes steam reforming, partial oxidation reforming, or autothermal reforming to produce a reformed gas (fuel gas).

For example, in a fuel gas supply apparatus used for a power generation apparatus including a solid polymer electrolyte fuel cell disclosed in Japanese Laid-Open Patent Publication No. 2006-260874, as shown in FIG. 8, a fuel gas supply line 2 is provided downstream of a fuel pump 1. The fuel gas supply line 2 is connected to the fuel pump 1, and a reformer 4 of a fuel processing apparatus 3 is connected to the fuel gas supply line 2. A desulfurizer 5 and a flow rate meter 6 are provided in the fuel gas supply line 2. The flow rate meter 6 is provided downstream of the desulfurizer 5.

The desulfurizer 5 functions as a pressure regulator. After the flow of the city gas supplied to the desulfurizer 5 is rectified, the city gas is discharged from the desulfurizer 5. According to the disclosure, in the structure, the pressure variation and the flow rate variation due to pulsation of the city gas supplied from the fuel pump 1 are suppressed by the desulfurizer 5.

However, in such a conventional technique, for example, when it becomes necessary that the fuel cell needs to be operated for a high load suddenly, and a large amount of fuel is requested to the fuel processing apparatus 3, by the pressure regulating operation of the desulfurizer 5, the load on the pump 1 becomes heavy. Under the circumstances, it is not possible to rapidly supply the fuel to the reformer 4. In view of the above, the size of the fuel pump 1 itself may be increased. However, the large fuel pump 1 cannot be used in practical applications.

Further, at the time of stopping operation of the fuel cell, since the desulfurizer 5 has the pressure regulating function, the fuel gas supply line 2 has a residual pressure of the fuel gas. Due to the residual pressure, the unnecessary fuel gas is supplied to the reformer 4. Therefore, operation of the fuel cell cannot be stopped promptly.

SUMMARY OF THE INVENTION

The present invention has been made to solve the problems of this type, and an object of the present invention is to provide a fuel cell system and a method of operating the fuel cell system in which the size of a raw fuel supply apparatus is reduced effectively, and the supply of a raw fuel is carried out stably and effectively depending on the operating condition.

The present invention relates to a fuel cell system including a fuel cell stack for performing power generation by electrochemical reactions of a fuel gas and an oxygen-containing gas, a reforming unit for reforming a raw fuel to produce the fuel gas, and supplying the fuel gas to the fuel cell stack, a raw fuel supply unit for supplying the raw fuel to the reforming unit, and a water supply unit for supplying water to the reforming unit.

The raw fuel supply unit has a raw fuel supply channel connected to the reforming unit, and a raw fuel supply apparatus for supplying the raw fuel, a desulfurizer for removing sulfur component from the raw fuel, and a flow rate meter for detecting a flow rate of the raw fuel are provided in the raw fuel supply channel such that the desulfurizer is provided downstream of the raw fuel supply apparatus, and the flow rate meter is provided downstream of the desulfurizer.

The raw fuel supply channel includes a first channel area provided upstream of the raw fuel supply apparatus, a second channel area provided downstream of the raw fuel supply apparatus, and upstream of the flow rate meter, a bypass channel having both ends respectively connected to the first channel area and the second channel area, for bypassing at least the raw fuel supply apparatus, and an open/close valve for opening and closing the bypass channel based on the pressure in the first channel area and the pressure in the second channel area.

Further, the present invention relates to a method of operating a fuel cell system including a fuel cell stack for performing power generation by electrochemical reactions of a fuel gas and an oxygen-containing gas, a reforming unit for reforming a raw fuel to produce the fuel gas, and supplying the fuel gas to the fuel cell stack, a raw fuel supply unit for supplying the raw fuel to the reforming unit, and a water supply unit for supplying water to the reforming unit. The raw fuel supply unit has a raw fuel supply channel connected to the reforming unit, and a raw fuel supply apparatus for supplying the raw fuel, a desulfurizer for removing sulfur component from the raw fuel, and a flow rate meter for detecting a flow rate of the raw fuel are provided in the raw fuel supply channel such that the desulfurizer is provided downstream of the raw fuel supply apparatus, and the flow rate meter is provided downstream of the desulfurizer.

The raw fuel supply channel includes a first channel area provided upstream of the raw fuel supply apparatus, a second channel area provided downstream of the raw fuel supply apparatus, and upstream of the flow rate meter, and a bypass channel having both ends respectively connected to the first channel area and the second channel area, for bypassing at least the raw fuel supply apparatus. Open/close control of the bypass channel is implemented based on the pressure in the first channel area and the pressure in the second channel area.

In the present invention, for example, when the pressure in the second channel area is higher than the pressure in the first channel area, the bypass channel is opened to release the pressure in the second channel area to the first channel area. In this structure, the raw fuel supply apparatus does not need to have a large capacity. For example, by simply controlling, e.g., the rotation number of the raw fuel pump, it becomes possible to stably supply the raw fuel.

Further, in the second channel area where the desulfurizer which functions as a buffer tank is provided, a residue pressure is generated by the desulfurizer. In this structure, since the residue pressure in the second channel area is released to the first channel area by the bypass channel, the time required for stopping operation of the fuel cell stack is reduced. Further, since no dedicated buffer tank is required, the facilities are simplified as a whole. Further, pulsation in the raw fuel supply apparatus is suppressed, and it becomes possible to stably supply the raw fuel.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 8 is a diagram showing a fuel gas supply apparatus used for a power generation apparatus including a solid polymer electrolyte fuel cell disclosed in Japanese Laid-Open Patent Publication No. 2006-260874.

DESCRIPTION OF THE PREFERRED EMBODIMENTS

Figure 1:
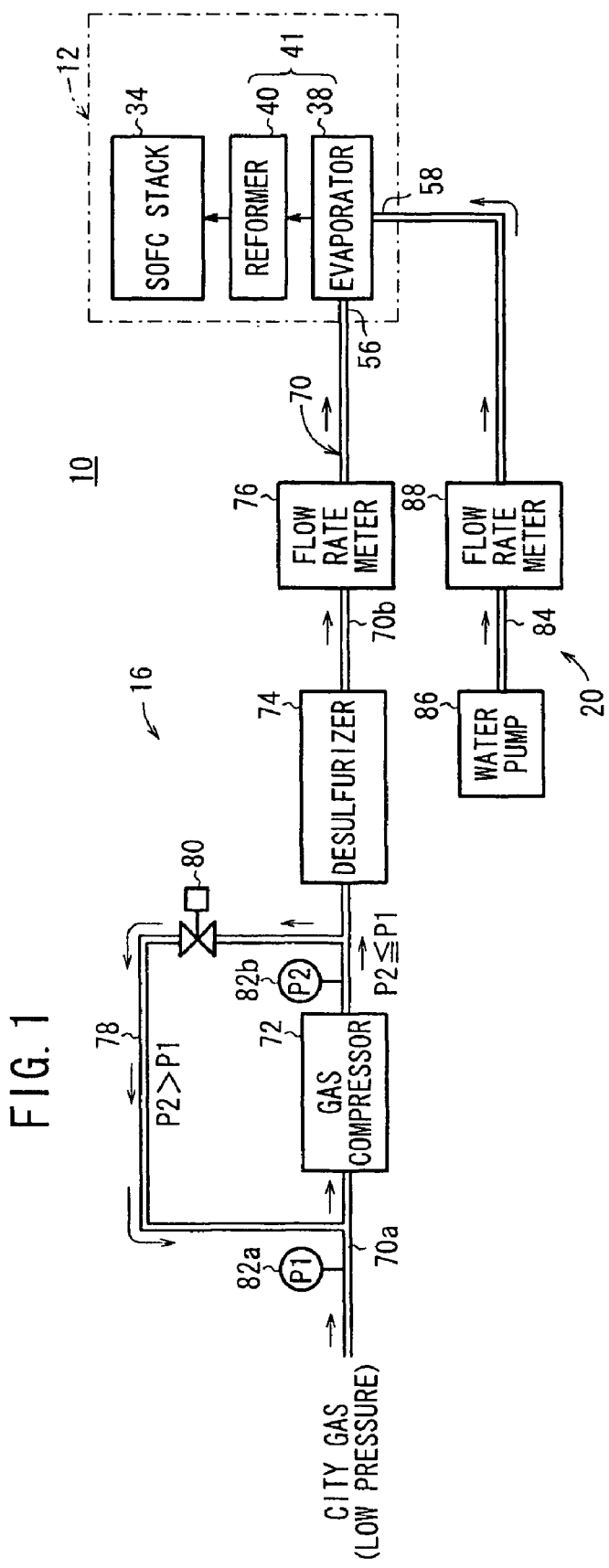
FIG. 1 is a diagram schematically showing structure of a mechanical circuit of a fuel cell system according to a first embodiment of the present invention.
Figure 2:
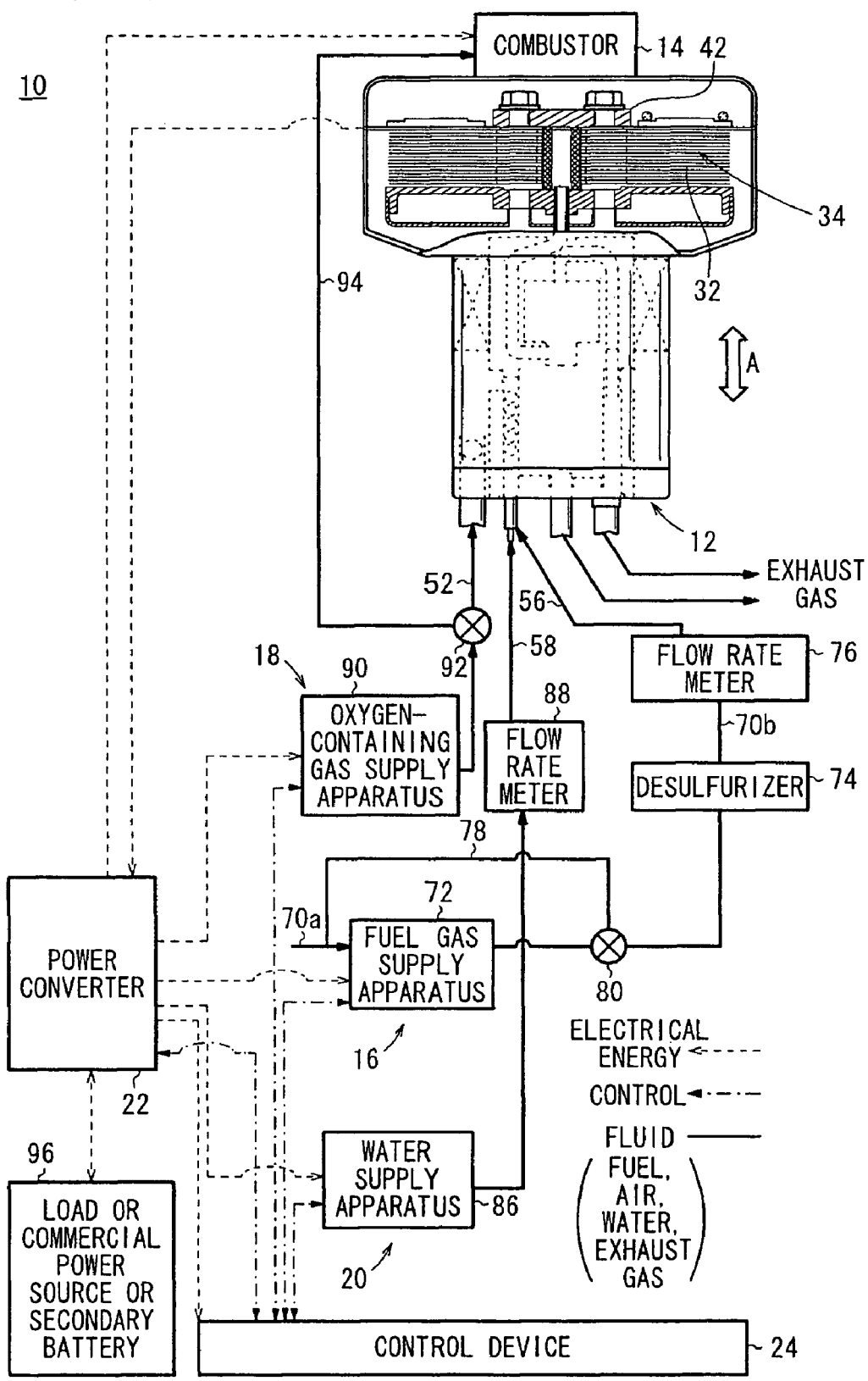
FIG. 2 is a circuit diagram showing the fuel cell system.

A fuel cell system 10 according to a first embodiment of the present invention shown in FIGS. 1 and 2 is used in various applications, including stationary and mobile applications. For example, the fuel cell system 10 is mounted on a vehicle. The fuel cell system 10 includes a fuel cell module 12 for generating electrical energy in power generation by electrochemical reactions of a fuel gas (hydrogen gas) and an oxygen-containing gas (air), a combustor (e.g., torch heater) 14 for raising the temperature of the fuel cell module 12, a raw fuel supply unit 16 for supplying a raw fuel chiefly containing hydrocarbon (e.g., city gas) to the fuel cell module 12, an oxygen-containing gas supply unit 18 for supplying an oxygen-containing gas to the fuel cell module 12, a water supply unit 20 for supplying water to the fuel cell module 12, a power converter 22 for converting the direct current electrical energy generated in the fuel cell module 12 to electrical energy according to the requirements specification, and a control device 24 for controlling the amount of electrical energy generated in the fuel cell module 12.

Figure 3:
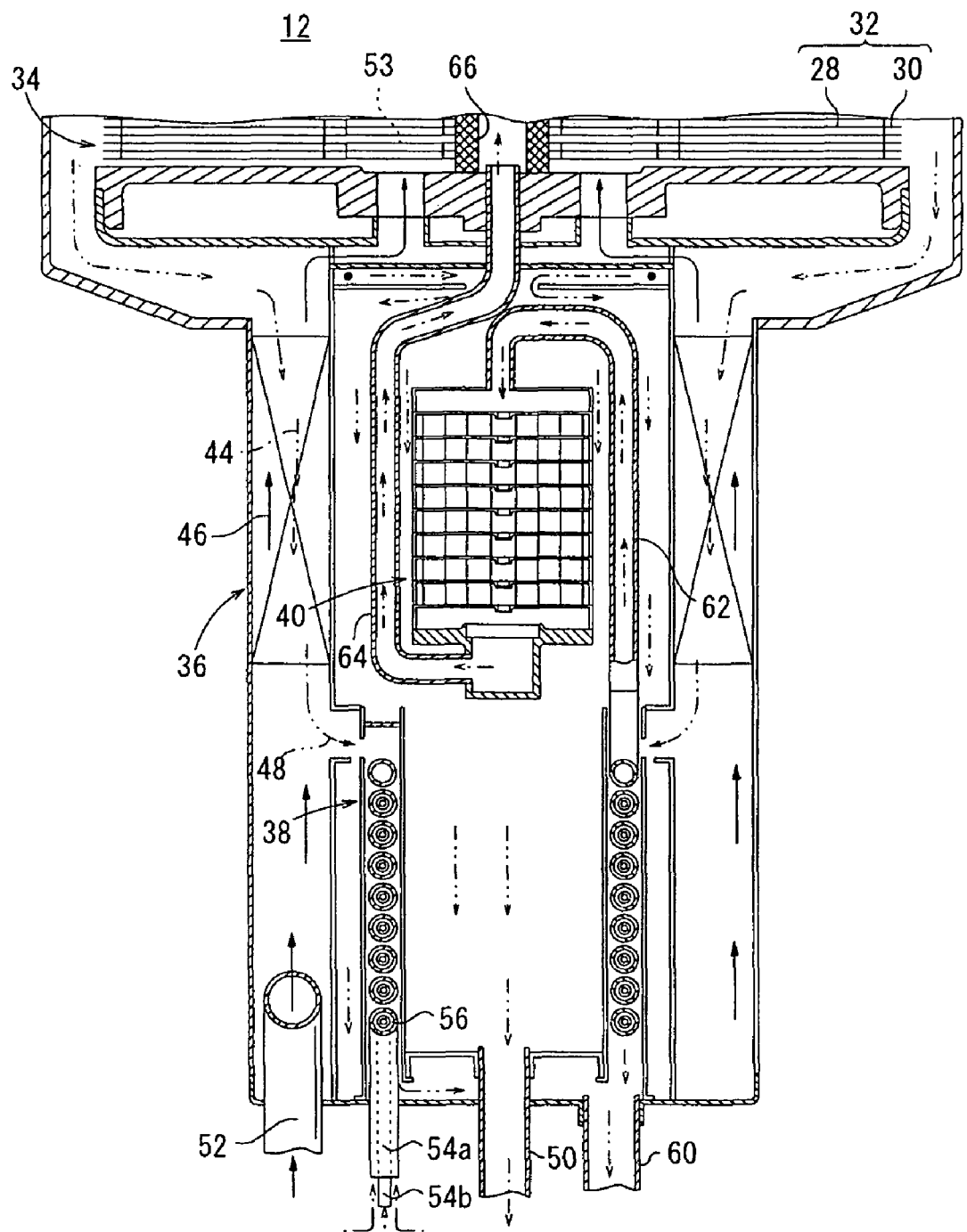
FIG. 3 is a cross sectional view showing main components of a fuel cell module of the fuel cell system.

As shown in FIG. 3, the fuel cell module 12 includes a fuel cell stack 34 formed by stacking a plurality of solid oxide fuel cells 32 in a vertical direction. The fuel cells 32 are formed by stacking electrolyte electrode assemblies 28 and separators 30. Though not shown, each of the electrolyte electrode assemblies 28 includes a cathode, an anode, and a solid electrolyte (solid oxide) interposed between the cathode and the anode. For example, the solid electrolyte is made of ion-conductive solid oxide such as stabilized zirconia.

At a lower end of the fuel cell stack 34 in the stacking direction, an heat exchanger 36 for heating the oxygen-containing gas before it is supplied to the fuel cell stack 34, an evaporator 38 for evaporating water to generate a mixed fluid of the desulfurized raw fuel and water vapor, and a reformer 40 for reforming the mixed fuel to produce a reformed gas are provided (see FIG. 1). The evaporator 38 and the reformer 40 make up a reforming unit 41 At an upper end of the fuel cell stack 34 in the stacking direction, a load applying mechanism 42 for applying a tightening load to the fuel cells 32 of the fuel cell stack 34 in the stacking direction indicated by the arrow A is provided (see FIG. 2).

The reformer 40 is a preliminary reformer for reforming higher hydrocarbon ($C_{2+}$) such as ethane ($C_2H_6$), propane ($C_3H_8$), and butane ($C_4H_{10}$) in the desulfurized city gas (raw fuel) into a fuel gas chiefly containing methane ($CH_4$) by steam reforming. The operating temperature of the reformer 40 is several hundred degrees Celsius.

The operating temperature of the fuel cell 32 is high, at several hundred degrees Celsius. In the electrolyte electrode assembly 28, methane in the fuel gas is reformed to obtain hydrogen, and the hydrogen is supplied to the anode.

As shown in FIG. 3, the heat exchanger 36 has a first exhaust gas channel 44 as a passage of a consumed reactant gas discharged from the fuel cell stack 34 (hereinafter also referred to as the exhaust gas or the combustion exhaust gas) and an air channel 46 as a passage of the air for allowing the air as a heated medium (heated fluid) and the exhaust gas to flow in a counterflow manner. The first exhaust gas channel 44 is connected to a second exhaust gas channel 48 for supplying the exhaust gas to the evaporator 38 as a heat source for evaporating water. Further, the first exhaust gas channel 44 is connected to an exhaust pipe 50. The upstream side of the air channel 46 is connected to an air supply pipe 52, and the downstream side of the air channel 46 is connected to an oxygen-containing gas supply passage 53 of the fuel cell stack 34.

The evaporator 38 has dual pipe structure including an outer pipe member 54a and an inner pipe member 54b provided coaxially. The dual pipe is provided in the second exhaust gas channel 48. A raw fuel channel 56 is formed between the outer pipe member 54a and the inner pipe member 54b. Further, a water channel 58 is formed in the inner pipe member 54b. In the evaporator 38, the raw fuel channel 56 is connected to the water channel 58. The raw fuel and the water vapor are mixed in the evaporator 38 as described later. The second exhaust gas channel 48 of the evaporator 38 is connected to a main exhaust pipe 60.

The outer pipe member 54a is connected to a mixed fuel supply pipe 62 coupled to an inlet of the reformer 40. One end of a reformed gas supply channel 64 is coupled to an outlet of the reformer 40, and the other end of the reformed gas supply channel 64 is connected to a fuel gas supply passage 66 of the fuel cell stack 34.

As shown in FIG. 1, the raw fuel supply unit 16 has a raw fuel supply channel 70 connected to the raw fuel channel 56 of the reforming unit 41. In the raw fuel supply channel 70, from the upstream side, a raw fuel supply apparatus 72 (including a gas compressor) for supplying raw fuel, a desulfurizer 74 for removing sulfur component in the raw fuel, and a flow rate meter 76 for detecting the flow rate of the raw fuel are arranged.

The raw fuel supply channel 70 includes a first channel area 70a on the upstream side of the raw fuel supply apparatus 72, a second channel area 70b between the downstream side of the raw fuel supply apparatus 72 and the upstream side of the flow rate meter 76, a bypass channel 78 having both ends respectively connected to the first channel area 70a and the second channel area 70b, and an open/close valve (solenoid valve) 80 provided in the bypass channel 78 for opening/closing the bypass channel 78 based on the pressure P1 in the first channel area 70a and the pressure P2 in the second channel area 70b.

One end of the bypass channel 78 is connected to a position between the raw fuel supply apparatus 72 and the desulfurizer 74, and the other end of the bypass channel 78 is connected to the upstream side of the raw fuel supply apparatus 72 to bypass the raw fuel supply apparatus 72. A first pressure meter 82a for detecting the pressure P1 in the first channel area 70a is provided upstream of the raw fuel supply apparatus 72, and a second pressure meter 82b for detecting the pressure P2 in the second channel area 70b is provided downstream of the raw fuel supply apparatus 72.

The water supply unit 20 includes a water supply channel 84 connected to the water channel 58 of the reforming unit 41. In the water supply channel 84, from the upstream side, a water supply apparatus 86 (including a water pump) for supplying water and a flow rate meter 88 for detecting the flow rate of the water are arranged.

As shown in FIG. 2, the oxygen-containing gas supply unit 18 includes an oxygen-containing gas supply apparatus (including a gas pump) 90. The oxygen-containing gas supply apparatus 90 is connected to the air supply pipe 52. A switching valve 92 is provided in the middle of the air supply pipe 52. The switching valve 92 is connected to an air branch channel 94, and the air branch channel 94 is connected to the combustor 14. For example, the combustor 14 includes a torch heater, and the air and electrical current are supplied to the combustor 14.

The raw fuel supply unit 16, the oxygen-containing gas supply unit 18, and the water supply unit 20 are controlled by the control device 24. The control device 24 functions as a control unit for closing the open/close valve 80 when the pressure P1 in the first channel area 70a is equal to the pressure P2 in the second channel area 70b, or the pressure P1 in the first channel area 70a is larger than the pressure P2 in the second channel area 70b (P1≧P2), and opening the open/close valve 80 when the pressure P1 in the first channel area 70a is smaller than the pressure P2 in the second channel area 70b (P1<P2). For example, a commercial power source 96 (or load, secondary battery, or the like) is connected to the power converter 22.

Operation of the fuel cell system 10 will be described below.

As shown in FIGS. 1 and 2, by operation of the raw fuel supply apparatus 72 of the raw fuel supply unit 16, for example, a raw fuel such as the city gas (including $CH_4$, $C_2H_6$, $C_3H_8$, $C_4H_{10}$) is supplied to the raw fuel supply channel 70. When the raw fuel passes through the desulfurizer 74, a desulfurized raw fuel is obtained, and the desulfurized raw fuel is supplied to the raw fuel channel 56.

Further, by operation of the water supply apparatus 86 of the water supply unit 20, water is supplied to the water channel 58 through the water supply channel 84, and the oxygen-containing gas such as the air is supplied to the air supply pipe 52 through the oxygen-containing gas supply apparatus 90 of the oxygen-containing gas supply unit 18.

As shown in FIG. 3, in the evaporator 38, since the raw fuel channel 56 is connected to the water channel 58, the desulfurized raw fuel flowing through the raw fuel channel 56 is mixed with the water vapor, and a mixed fuel is obtained. The mixed fuel is supplied to the inlet of the reformer 40 through the mixed fuel supply pipe 62. The mixed fuel undergoes steam reforming in the reformer 40. Thus, hydrocarbon of $C_{2+}$ is removed (reformed), and a reformed gas chiefly containing methane is obtained. The reformed gas flows through the reformed gas supply channel 64 connected to the outlet of the reformer 40, and the reformed gas is supplied to the fuel gas supply passage 66 of the fuel cell stack 34. Thus, the methane in the reformed gas is reformed, and the hydrogen gas is obtained. The fuel gas chiefly containing the hydrogen gas is supplied to the anode (not shown).

The air supplied from the air supply pipe 52 to the heat exchanger 36 moves along the air channel 46 in the heat exchanger 36, and heated to a predetermined temperature by heat exchange with the exhaust gas moving along the first exhaust gas channel 44 as described later. The air heated by the heat exchanger 36 is supplied to the oxygen-containing gas supply passage 53 of the fuel cell stack 34, and the air is supplied to the cathode (not shown).

Thus, in the electrolyte electrode assembly 28, by electrochemical reactions of the fuel gas and the air, power generation is performed. The hot exhaust gas (several hundred degrees Celsius) discharged to the outer circumferential region of each of the electrolyte electrode assemblies 28 flows through the first exhaust gas channel 44 of the heat exchanger 36, and heat exchange with the air is carried out. The air is heated to a predetermined temperature, and the temperature of the exhaust gas is decreased.

When the exhaust gas moves along the second exhaust gas channel 48, the water passing through the water channel 58 is evaporated. After the exhaust gas passes through the evaporator 38, the exhaust gas is discharged to the outside through the main exhaust pipe 60.

In the first embodiment, at the time of starting operation of the fuel cell stack 34, at the time of stopping operation of the fuel cell stack 34, and at the time of changing the load, the control device 24 implements the open/close control of the open/close valve 80. The open/close control of the open/close valve 80 may be implemented at least at any of the time of starting operation of the fuel cell stack 34, the time of stopping operation of the fuel cell stack 34, and the time of changing the load.

Firstly, at the time of starting operation of the fuel cell stack 34, it is required to supply the raw fuel to the reforming unit 41 by starting operation of the raw fuel supply apparatus 72. The meaning of starting operation herein not only includes normal start-up operation from the initial state for placing the fuel cell stack 34 in a power generation state but also includes restart operation from the paused (idle) state. At the time of starting operation, if the pressure P1 in the first channel area 70a is smaller than the pressure P2 in the second channel area 70b (P1<P2), it is not possible to effectively operate the raw fuel supply apparatus 72. Therefore, the raw fuel cannot be supplied, and the raw fuel supply apparatus 72 may be damaged undesirably.

Figure 4:
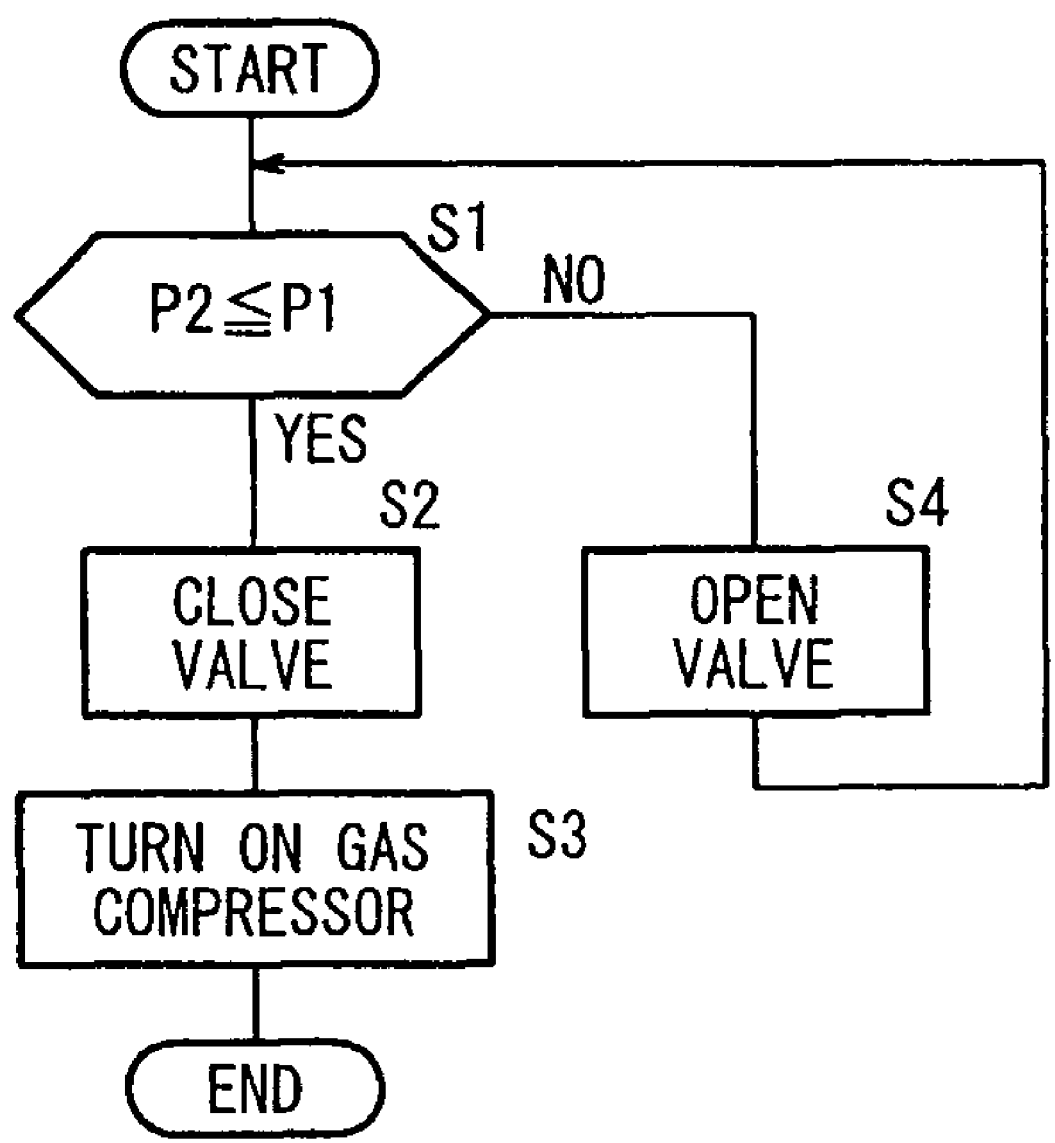
FIG. 4 is a flow chart showing a method of operating the fuel cell system.

Therefore, at the time of starting operation, the control device 24 monitors the pressures P1, P2 obtained from the first pressure meter 82a and the second pressure meter 82b (step S1 in FIG. 4). Then, if it is detected that the pressure P1 is equal to, or larger than the pressure P2 (P1≧P2) (YES in step S1), the process proceeds to step S2 to close the open/close valve 80, and operation of the raw fuel supply apparatus (gas compressor) 72 is started. Thus, after the raw fuel is desulfurized by the desulfurizer 74 through the raw fuel supply apparatus 72, the desulfurized raw fuel is supplied to the reforming unit 41 under pressure.

In step S1, if it is detected that the pressure P1 is smaller than the pressure P2 (P1<P2) (NO in step S1), the process proceeds to step S4 to open the open/close valve 80. Thus, by connecting the second channel area 70b at high pressure to the first channel area 70a at low pressure, the pressure P2 in the second channel area 70b is lowered until the pressure P1 becomes equal to the pressure P2 (P1=P2). After the pressure P1 becomes equal to the pressure P2, the open/close valve 80 is closed, and the raw fuel supply apparatus 72 is placed in the ON state (step S2 and step S3).

Thus, in the raw fuel supply unit 16, channel switching operation in correspondence with the pressure is performed. After the pressure P2 in the second channel area 70b is lowered rapidly, the supply of the raw fuel from the raw fuel supply apparatus 72 is carried out simply and suitably.

No residual pressure is present in the second channel area 70b downstream of the raw fuel supply apparatus 72. Therefore, the size of the raw fuel supply apparatus 72 is not required to be excessively large, and reduction in energy consumption is achieved. Accordingly, for example, simply by controlling the rotation number of the gas compressor, supply of the raw fuel can be carried out efficiently and stably.

At the time of changing the load of the fuel cell stack 34, as in the case of starting operation of the fuel cell stack 34, the open/close control of the open/close valve 80 is implemented in accordance with the flow chart shown in FIG. 4. That is, in the case where the pressure in the fuel cell stack 34 changes, the amount of supplied raw fuel (pressure) is changed in correspondence with the change in the load. If the pressure P1 is smaller than the pressure P2 (P1<P2), the raw fuel cannot be supplied from the raw fuel supply apparatus 72 under pressure. Thus, by opening the open/close valve 80, the pressure P2 is lowered. Accordingly, the supply of the raw fuel in correspondence with the change in the load can be carried out simply and suitably.

Figure 5:
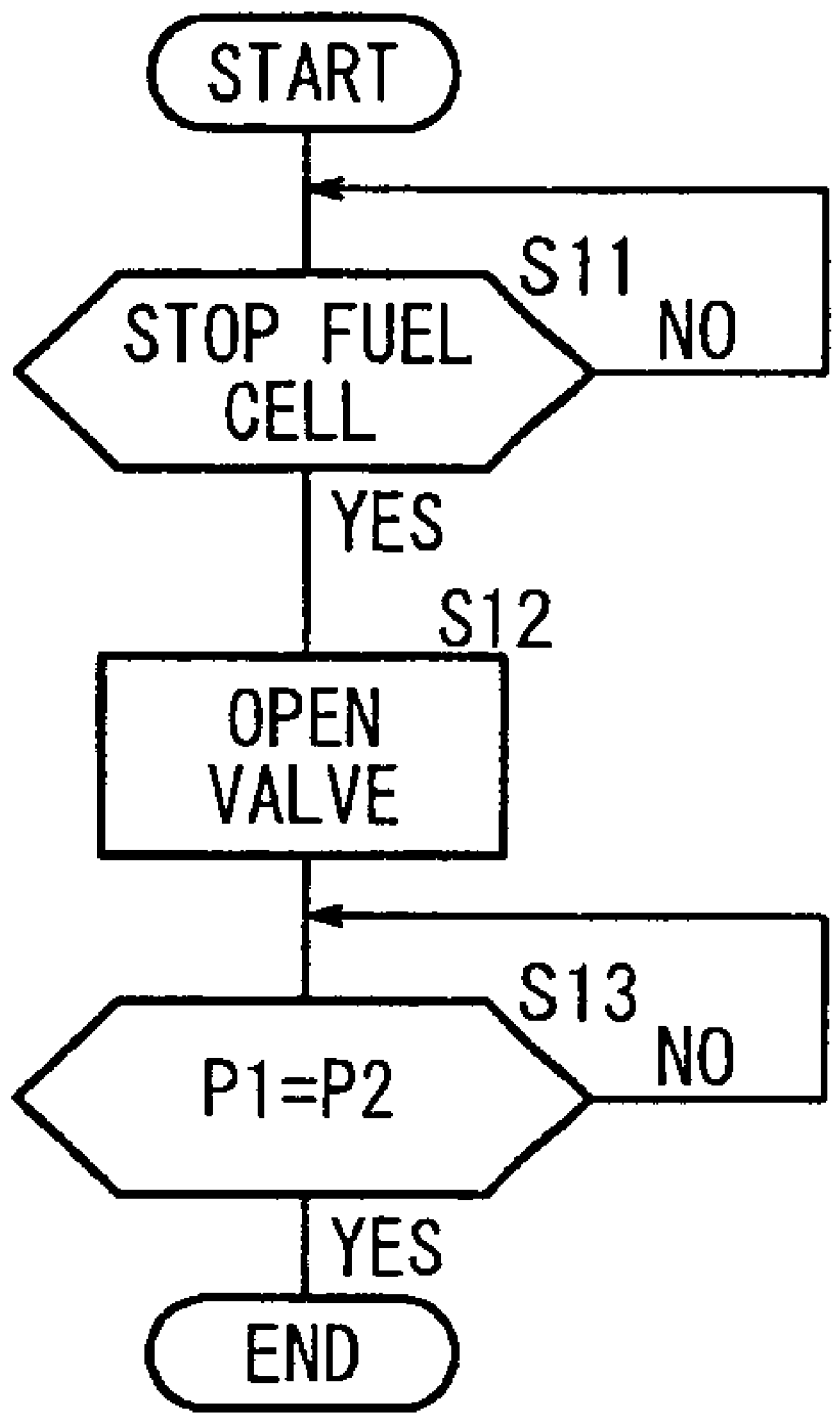
FIG. 5 is a flow chart showing a method of operating the fuel cell system.

Then, at the time of stopping the fuel cell stack 34, control is implemented in accordance with a flow chart shown in FIG. 5. Firstly, when the fuel cell stack 34 is stopped (YES in step S11), the process proceeds to step S12 to open the open/close valve 80.

That is, when operation of the raw fuel supply apparatus 72 is stopped, the desulfurizer 74 functions as a buffer tank. Therefore, a delay occurs in the process of lowering the pressure in the second channel area 70b. Thus, even after the raw fuel supply apparatus 72 is stopped, the raw fuel tends to flow easily from the desulfurizer 74 to the reforming unit 41. Therefore, in order to prevent coking or the like, it is necessary to supply water from the water supply unit 20 to the reforming unit 41. Consequently, it takes significant time to completely stop operation of the fuel cell stack 34.

In this regard, in the first embodiment, at the time of stopping operation of the fuel cell stack 34, by opening the open/close valve 80, the pressure in the desulfurizer 74 is returned to the pressure in the first channel area 70a, which has a low pressure, to lower the pressure in the desulfurizer 74 (step S13). In this manner, the flow of the raw fuel to the reforming unit 41 is suppressed, and it is possible to rapidly stop operation of the fuel cell stack 34.

Further, since the desulfurizer 74 functions as the buffer tank, no dedicated buffer tank is required. Thus, the facilities are simplified as a whole, and pulsation in the raw fuel supply apparatus 72 is suppressed. It becomes possible to stably supply the raw fuel.

Figure 6:
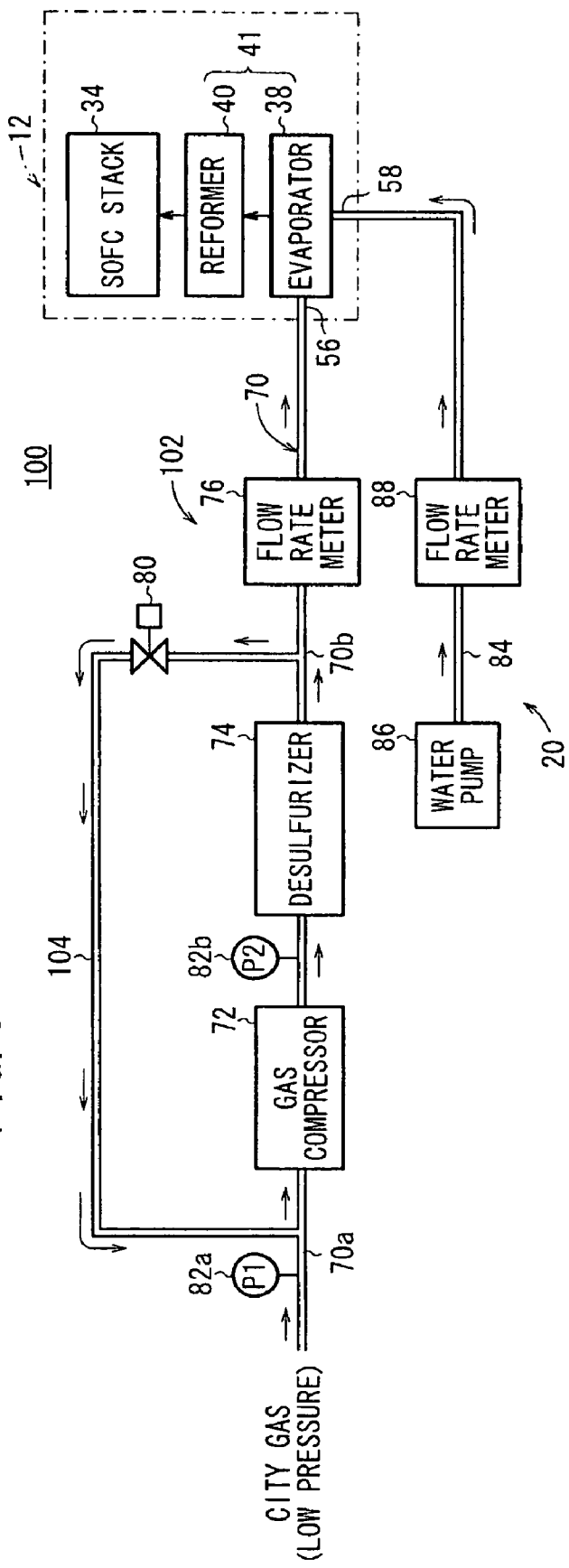
FIG. 6 is a diagram schematically showing structure of a mechanical circuit of a fuel cell system according to a second embodiment of the present invention.

FIG. 6 is a diagram schematically showing structure of a mechanical circuit of a fuel cell system 100 according to a second embodiment of the present invention. The constituent elements that are identical to those of the fuel cell system 10 according to the first embodiment are labeled with the same reference numerals, and description thereof will be omitted. Also in a third embodiment as described below, the constituent elements that are identical to those of the fuel cell system 10 according to the first embodiment are labeled with the same reference numerals, and detailed description thereof will be omitted.

The fuel cell system 100 includes a raw fuel supply unit 102. The raw fuel supply unit 102 includes a bypass channel 104. One end of the bypass channel 104 is connected to a position between the desulfurizer 74 and the flow rate meter 76, and the other end of the bypass channel 104 is connected to a position upstream of the raw fuel supply apparatus 72.

In the second embodiment, by opening/closing the bypass channel 104 based on the pressure P1 in the first channel area 70a and the pressure P2 in the second channel area 70b, the same advantages as in the case of the first embodiment are obtained.

Figure 7:
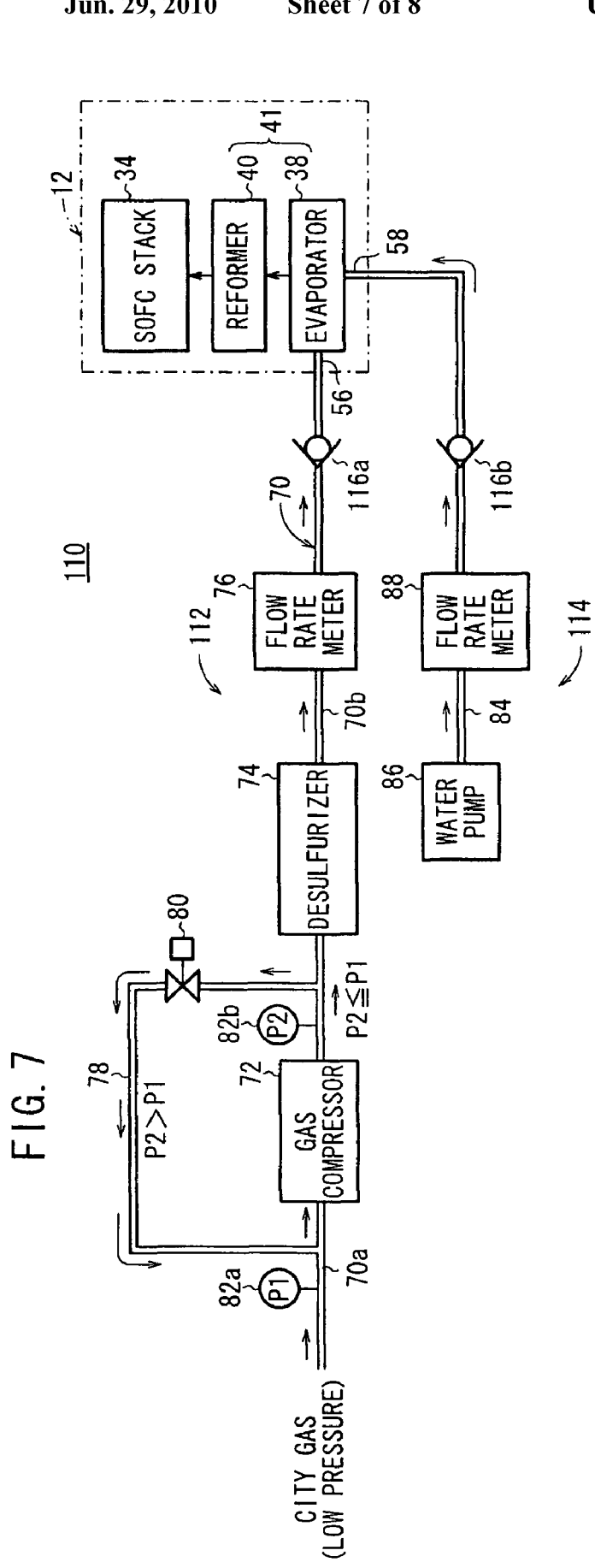
FIG. 7 is a diagram schematically showing structure of a mechanical circuit of a fuel cell system according to a third embodiment of the present invention.

FIG. 7 is a diagram schematically showing structure of a mechanical circuit of a fuel cell system 110 according to the third embodiment of the present invention.

The fuel cell system 110 includes a raw fuel supply unit 112 and a water supply unit 114. The raw fuel supply unit 112 has a first check valve 116a disposed between the flow rate meter 76 and the evaporator 38 for preventing the flow toward the flow rate meter 76. Further, the water supply unit 114 has a second check valve 116b disposed between the flow rate meter 88 and the evaporator 38 for preventing the flow toward the flow rate meter 88.

In the third embodiment, the raw fuel supply unit 112 has the first check valve 116a disposed between the flow rate meter 76 and the evaporator 38 for making it possible to prevent the backflow of the raw fuel and the water from the evaporator 38 to the flow rate meter 76. Likewise, the water supply unit 114 has the second check valve 116b disposed between the flow rate meter 88 and the evaporator 38 for making it possible to prevent the backflow of the raw fuel and the water from the evaporator 38 to the flow rate meter 88.

While the invention has been particularly shown and described with reference to preferred embodiments, it will be understood that variations and modifications can be effected thereto by those skilled in the art without departing from the scope of the invention as defined by the appended claims.

What is claimed is:

1. A fuel cell system, comprising:
   a fuel cell stack for performing power generation by electrochemical reactions of a fuel gas and an oxygen-containing gas;
   a reforming unit for reforming a raw fuel to produce the fuel gas, and supplying the fuel gas to the fuel cell stack;
   a water supply unit for supplying water to the reforming unit;
   a raw fuel supply unit for supplying the raw fuel to the reforming unit, wherein the raw fuel supply unit includes a raw fuel supply channel connected to the reforming unit, a raw fuel supply apparatus for supplying the raw fuel to a desulfurizer, the desulfurizer for removing sulfur component from the raw fuel, and a flow rate meter for detecting a flow rate of the raw fuel,
   the raw fuel supply apparatus, the desulfurizer, and the flow rate meter are provided in the raw fuel supply channel such that the desulfurizer is provided downstream of the raw fuel supply apparatus, and the flow rate meter is provided downstream of the desulfurizer,
   the raw fuel supply channel including a first channel area provided upstream of the raw fuel supply apparatus, a second channel area provided downstream of the raw fuel supply apparatus and upstream of the flow rate meter, a bypass channel having both ends respectively connected to the first channel area and the second channel area, for bypassing at least the raw fuel supply apparatus, and an open/close valve for opening and closing the bypass channel based on a pressure in the first channel area and a pressure in the second channel area; and a control unit programmed to close the bypass channel by the open/close valve when the pressure in the first channel area is equal to the pressure in the second channel area, or when the pressure in the first channel area is larger than the pressure in the second channel area, and for opening the bypass channel by the open/close valve when the pressure in the first channel area is smaller than the pressure in the second channel area.

2. A fuel cell system according to claim 1, wherein the reforming unit comprises:

an evaporator for obtaining mixed vapor of the raw fuel and the water; and a reformer for reforming the mixed vapor.

3. A fuel cell system according to claim 2, wherein the raw fuel supply unit and the water supply unit are connected in the evaporator.

4. A fuel cell system according to claim 2, wherein the raw fuel supply unit includes a check valve between the flow rate meter and the evaporator.

5. A fuel cell system according to claim 2, wherein the water supply unit includes a water supply channel connected to the reforming unit; and a water supply apparatus for supplying the water, a flow rate meter for detecting the flow rate of the water, and a check valve are provided in the water supply channel such that the flow rate meter is provided downstream of the water supply apparatus, and the check valve is provided downstream of the flow rate meter.

* * * * *